UNITED STATES PATENT OFFICE.

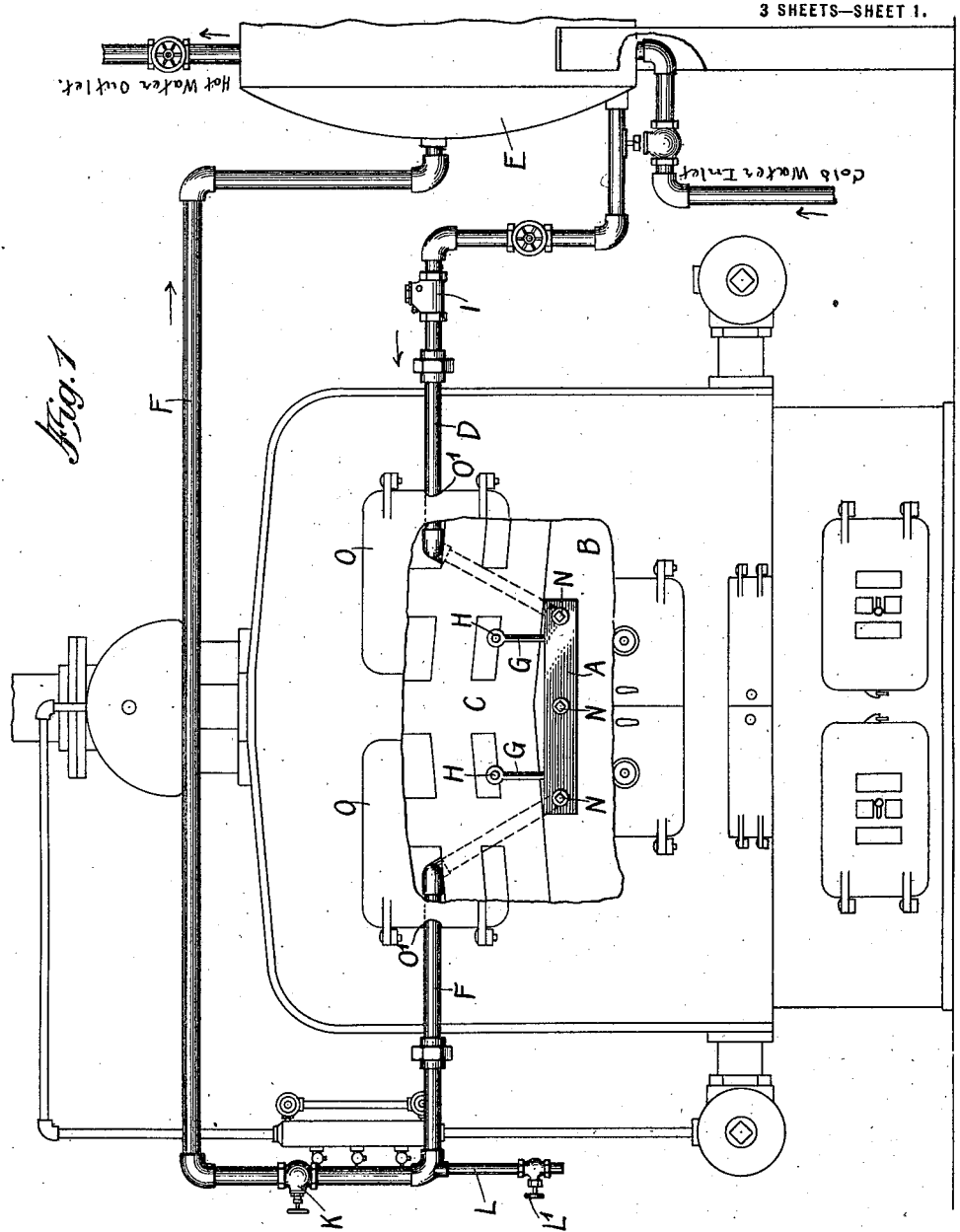
S. C. WELLS.
WATER HEATER.
APPLICATION FILED OCT. 30, 1914.
1,159,304.
Patented Nov. 2, 1915.
3 SHEETS—SHEET 1.
INVENTOR
Smith C. Wells

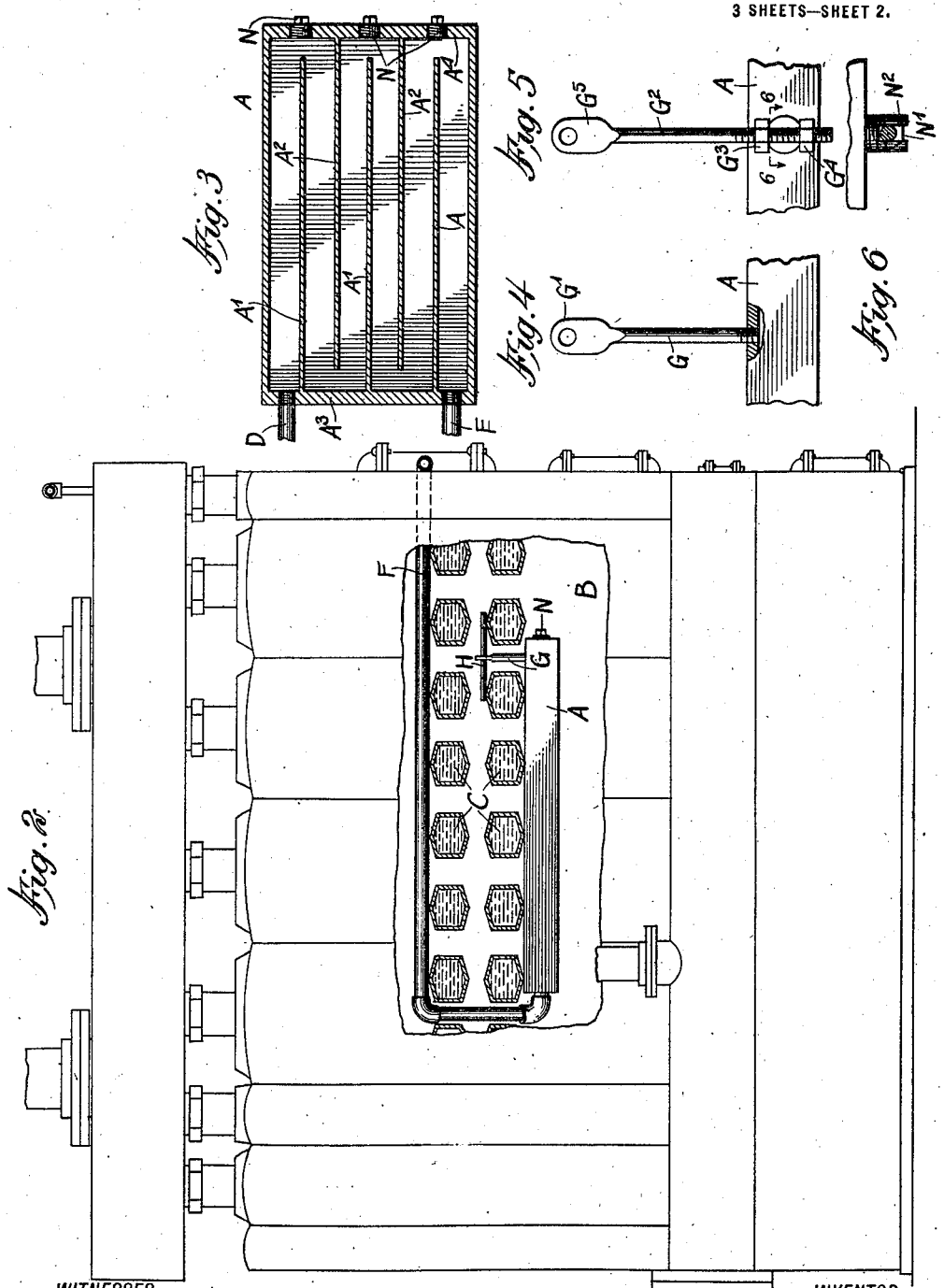

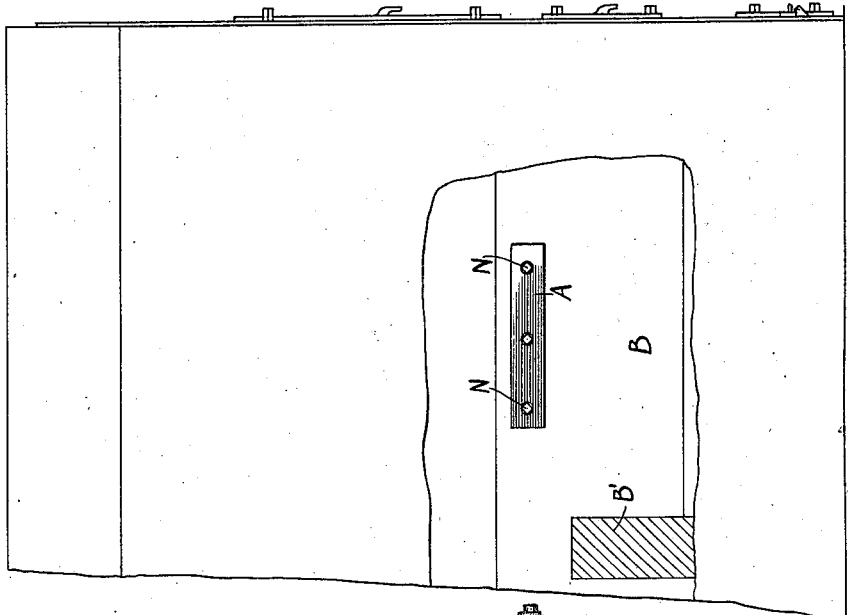
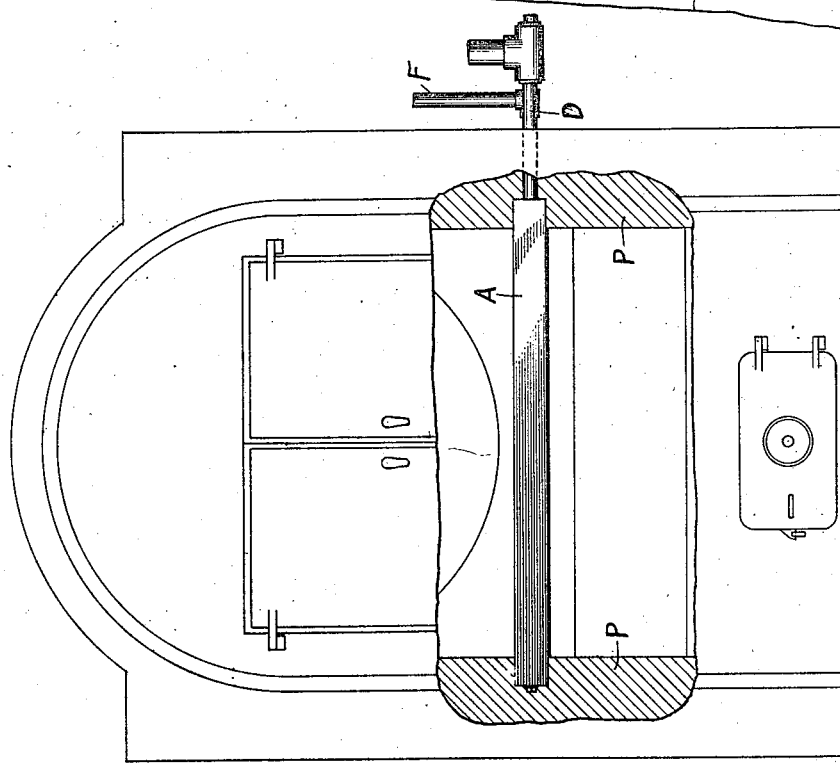

SMITH C. WELLS, OF NEW YORK, N. Y.

WATER-HEATER.

1,159,304.  Specification of Letters Patent.  Patented Nov. 2, 1915.

Application filed October 30, 1914. Serial No. 869,381.

*To all whom it may concern:*

Be it known that I, SMITH C. WELLS, a citizen of the United States, and a resident of the city of New York, borough of Manhattan, in the county and State of New York, have invented a new and Improved Water-Heater, of which the following is a full, clear, and exact description.

The object of the invention is to provide a new and improved water heater, more especially designed as an attachment to a steam generator, such as is used in apartment houses, hotels and like buildings for furnishing steam to radiators in the various rooms for heating purposes, and arranged to dispense with separate water heaters for supplying the tenants with hot water.

In order to accomplish the desired result, use is made of a casing mounted in the combustion chamber of the steam generator and provided with a circuitous passage for the water, the said passage being connected at one end with an inlet pipe and at the other end with an outlet pipe, the said pipes being connected with a hot water supply tank.

A practical embodiment of the invention is represented in the accompanying drawings forming a part of this specification, in which similar characters of reference indicate corresponding parts in all the views.

Figure 1 is a front elevation of the water heater as applied to a steam generator of the sectional type, part of the generator being shown broken out; Fig. 2 is a side elevation of the same with the part of the steam generator in section and part broken out; Fig. 3 is a sectional plan view of the casing of the water heater; Fig. 4 is a front elevation of a portion of the casing of the water heater and one of the suspending rods for supporting one end of the casing in the combustion chamber, a part of the heater casing being shown in section; Fig. 5 is a front elevation of a modified form of the suspension for the casing of the water heater as applied; Fig. 6 is a sectional plan view of the same on the line 6—6 of Fig. 3; Fig. 7 is a front elevation of the water heater as applied to a horizontal tubular steam generator, part of the steam generator being shown in section and part broken out; and Fig. 8 is a side elevation of the same with part of the steam generator in section and part broken out.

As shown in Figs. 1 and 2, the casing A of the water heater is located in the upper portion of the fire box or combustion chamber B, directly below the lowermost row of water-circulating tubes C of a steam generator of the sectional or similar type. The casing A is preferably of rectangular shape and cast in one piece (see Fig. 3) and the interior of the casing is provided with a circuitous passage formed by partitions A', A² extending alternately from opposite ends A³, A⁴ of the casing A. The partitions A' terminate a short distance from the end A⁴ while the partitions A² terminate a short distance from the other end A³, whereby the water is caused to flow slowly through the circuitous passage, to insure a quick heating of the same from the heat in the fire box or combustion chamber B. The entrance end of the circuitous passage in the casing A is connected with a supply pipe D connected with a hot water supply tank E connected by a pipe F with the discharge end of the circuitous passage in the casing A.

The pipes D and F extend over some of the water-circulating tubes C, as plainly indicated in Fig. 2, to support the rear end of the casing A by the said pipes D and F. The front end of the casing A is supported by suspension rods G tapped into the top of the casing A and extending upwardly between the adjacent tubes C, each rod terminating at its upper end in an eye G' through which passes a bar H resting on top of the said adjacent tube C. By the arrangement described the casing A is conveniently held suspended in the upper portion of the fire box or combustion chamber B, so that the heat emanating from the burning fuel in the fire box heats the casing A and the water circulating through the same.

The supply pipe D is provided with a check valve I and a controlling valve J for controlling the water passing through the pipe D from the tank E to the casing A. The return pipe F is provided with a controlling valve K and with a blow-off pipe L located outside of the steam generator at a point between the valve K and the casing A. The blow-off pipe L is provided with a valve L' normally in a closed position.

The front end of the casing A is provided with screw plugs N located directly opposite the free ends of the partition A' to permit of cleaning the circuitous passage of sediment on removal of the said plugs at the time the valves J and K are closed. Another way of cleaning the casing A is by closing the valve K and opening the valve L' so that the water passing through the casing A carries the sediment along and discharges it through the pipe L to a pail or other suitable receptacle held at the end of the pipe L. In practice, the pipes D and F pass through the openings normally covered by the cleaning-out doors O arranged on the front of the steam generator, and the said doors are provided with recesses O' for the pipes to pass to the outside of the steam generator and then to the tank E, as previously explained.

The suspension illustrated in Figs. 5 and 6 is in the form of rods $G^2$ each extending at its lower end through a slot N' formed in a corresponding plug $N^2$ screwing in the front end $A^4$ of the casing A, the same as above described in reference to the plugs N. The lower end of each rod $G^2$ is threaded and engaged by nuts $G^3$, $G^4$ abutting against the top and bottom of the plug $N^2$ to securely hold the rod $G^2$ in position on the said plug. The upper end of the rod $G^2$ is provided with an eye $G^5$ for the reception of a bar H, the same as above described and shown in Fig. 2.

In the modified form shown in Figs. 7 and 8, the casing A is turned around so that its ends are embedded in the side walls P of the steam generator, and in this case the pipes D and F extend through the side walls of the steam generator to connect with the receiving tank E. Otherwise the construction of the water heater is the same as above described in reference to Figs. 1, 2 and 3.

By reference to Fig. 8, it will be noticed that the casing A forms a deflector for the heat rising from the burning fuel to deflect the said heat toward the front of the bridge wall B', thus preventing heat from passing too quickly to the chimney.

The water heater shown and described is very simple in construction, and can be readily applied to steam generators of various types without requiring a material change in the generators, as now constructed.

Having thus described my invention, I claim as new and desire to secure by Letters Patent:

1. A water heater, comprising a casing of rectangular shape formed in one piece and having an interior circuitous passage for the water, means for heating the same comprising a combustion chamber in which the said water heater is arranged, an inlet pipe connected with one end of said passage, an outlet pipe leading from the other end of the said passage, means for supporting the pipes, the said pipes extending into the combustion chamber and forming a support for one end of the said water heater, suspension means connected with the said water heater at the other end thereof, controlling valves in the said pipes, and a valved blow-off pipe connected with the said outlet pipe at a point intermediate the valve of the outlet pipe and the water heater.

2. A water heater, comprising a casing made in one piece and having an interior circuitous passage for the water, means for heating the same, including a combustion chamber, an inlet pipe connected with one end of said passage, an outlet pipe leading from the other end of the said passage, means for supporting the said pipes within the combustion chamber, the said pipes forming a support for one end of the water heater, hanger arms attached to the said water heater at the other end thereof, spaced supports within the combustion chamber, and between which the said hanger rods extend, and supporting rods resting on said supports and engaging the said hanger arms.

3. In a water heater, a casing having a circuitous passage therein, inlet and outlet pipes attached to one end of the casing at the ends of said passage and forming a support for said end, horizontally arranged supporting rods engaging fixed supports, and vertically arranged hanger arms having eyes at their upper ends engaged by said supporting rods, the said hanger arms being secured at their lower ends to the other end of said casing.

4. In a water heater, a casing provided with partitions extending alternately from opposite ends, and forming a circuitous passage, means for heating the casing including a combustion chamber, inlet and outlet pipes attached to one end of the casing at the ends of said passage, supports for said pipes within the combustion chamber, the said pipes forming a support for one end of the casing, screw plugs screwing in the other end of the casing opposite the free ends of the partitions, said screw plugs being provided with slots, suspension means for the last mentioned end of the casing and including hanger arms extending at their lower ends through the said slots in the plugs, and means for holding the hanger arms in position.

In testimony whereof I have signed my name to this specification in the presence of a subscribing witness.

SMITH C. WELLS.

Witness:
THEO. G. HOSTER.